(No Model.)
T. A. EDISON.
SYSTEM OF ELECTRICAL DISTRIBUTION.
No. 379,772. Patented Mar. 20, 1888.
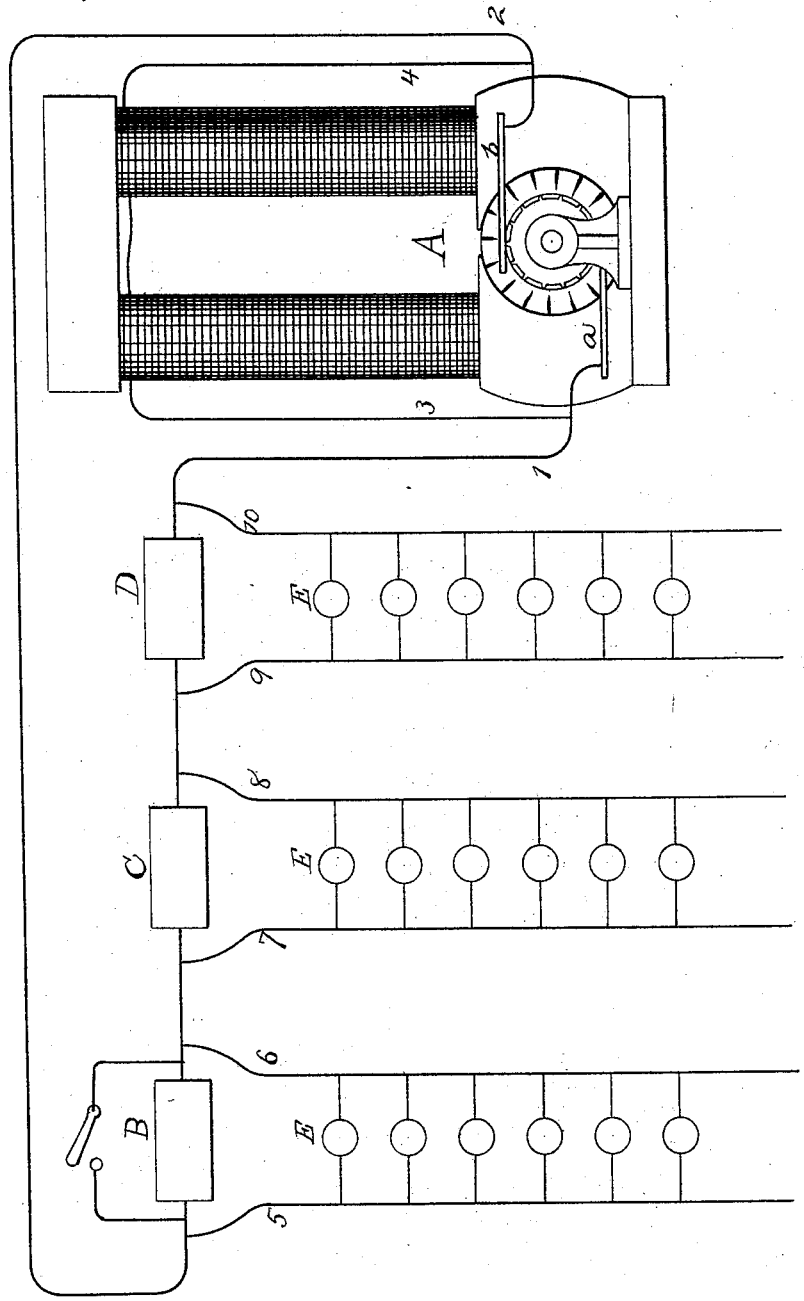
WITNESSES:
E. C. Rowlands
H. W. Seely
INVENTOR:
Thomas A. Edison
BY Rich'd N. Dyer,
ATTORNEY.
N. PETERS, Photo-Lithographer, Washington, D. C.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

SYSTEM OF ELECTRICAL DISTRIBUTION.

SPECIFICATION forming part of Letters Patent No. 379,772, dated March 20, 1888.

Application filed August 7, 1882. Serial No. 68,639. (No model.) Patented in England August 5, 1882, No. 3,752; in Italy November 14, 1882, No. 14,758; in Belgium November 15, 1882, No. 59,457; in France December 13, 1882, No. 151,279; in Spain April 4, 1883, No. 3,737, and in Germany July 26, 1883, No. 23,270.

*To all whom it may concern:*

Be it known that I, THOMAS A. EDISON, of Menlo Park, in the county of Middlesex and State of New Jersey, have invented a new and useful Improvement in Systems of Electrical Distribution, (for which I have obtained Letters Patent in Great Britain, No. 3,752, August 5, 1882; Italy, No. 14,758, November 14, 1882; Belgium, No. 59,457, November 15, 1882; France, No. 151,279, December 13, 1882; Spain, No. 3,737, April 4, 1883, and Germany, No. 23,270, July 26, 1883;) and I do hereby declare that the following is a full and exact description of the same, reference being had to the accompanying drawing, and to the letters of reference marked thereon.

The object I have in view is to produce efficient and economical means for dividing an electric current of high electro-motive force or tension into a number of currents of lower electro-motive force or tension, and for making all the translating devices operated by the currents of lower tension independent of each other. Such an arrangement makes a great saving in conductors, since a high-tension current can be used from the point of generation to near the point of consumption, and the translating devices can be made independent by a multiple-arc arrangement. It is the especial design of the peculiar means employed by me to accomplish this subdivision of an electric current, to reduce to the minimum the loss of power occasioned thereby.

The main object is accomplished by throwing into the main circuit, at a number of points, a counter electro-motive force, which causes between certain points a definite drop in the tension of the main circuit. From these points are run pairs of conductors, and the translating devices—such as lamps or motors—are located in multiple-arc circuits from these auxiliary conductors. Each pair of auxiliary conductors, with its translating devices, forms a shunt-circuit from the main circuit. Electric motors may be used for producing the counter electro-motive force; but economy is best secured by means of secondary batteries, which can be used to supply the translating devices for a time after being fully charged.

In the accompanying drawing, forming a part hereof, an arrangement embodying the invention is shown diagrammatically.

A is a dynamo or magneto electric machine, from the commutator-brushes $a$ $b$ of which run the conductors of the main circuit 1 2. The field-circuit 3 4 of the machine A is a multiple-arc circuit from 1 2, and the machine is regulated in any of the known ways, preferably by shifting the commutator-brushes or by varying primarily the current flowing through the field-circuit. This machine has a high electromotive force. For purposes of illustration, this may be considered as three hundred volts. A number of these machines may be arranged in multiple arc, or machines having a lower electro-motive force may be arranged in series or multiple series to produce a current of high tension.

B C D represent the means for throwing counter electro-motive force into the circuit 1 2, which means may be secondary batteries, electric motors, or other devices. To the main circuit, on opposite sides of B C D, are connected the conductors 5 and 6, 7 and 8, and 9 and 10 of shunt-circuits, in multiple-arc circuits from which conductors are located the lamps, motors, or other translating devices E. The counter electro-motive force of each device B C D is approximately one hundred volts, and there is approximately a drop of one hundred volts between the points where 5 and 6 are connected with 1 2, as well as between the connections of 7 and 8 and 9 and 10 with 1 and 2. This causes a current to flow through each shunt-circuit having a tension approximately of one hundred volts. The making or breaking of the circuit of any translating device does not affect other translating devices in the same shunt-circuit or those in the other shunt-circuits. To secure the greatest economy, secondary batteries are used to give the necessary counter electro-motive force. B C D represent such secondary batteries. After the secondary batteries are fully charged, the main circuit between the same and the machine A may be broken, when the secondary batteries will discharge through the shunt-circuits supplying the translating devices.

By arranging the devices B C D, whether secondary batteries or not, to give counter electro-motive force of different degrees of intensity, or of different volts, currents varying in tension can be produced in the shunt-circuits, and circuits can be provided for half as well as whole lights, or this can be done by dividing the current in one or more of the shunts on the same principle that is employed to divide the current in the main circuit. A simple shunt-circuit of low resistance (shown at the device B) may be arranged around each of the devices B C D, by closing which and breaking the circuit of the secondary battery the translating devices in the shunt around the secondary battery will be cut off from the source of supply. In that case it is necessary to reduce the electro-motive force at the source of supply, which can be readily done by adjusting the machine or machines.

What I claim is—

1. The method of dividing an electric current, consisting in throwing counter electro-motive force into a main circuit at two or more points, and providing shunt-circuits around the sources of such counter electro-motive force, through which shunt-circuits currents of lower tension flow, substantially as set forth.

2. The combination of one or more dynamo or magneto electric machines supplying a current of high tension in a main circuit, with means for throwing counter electro-motive force into such main circuit at two or more points, shunt-circuits around the sources of such counter electro-motive force, and translating devices connected in multiple arc in such shunt-circuits, substantially as set forth.

3. The combination, with a main circuit having a current of high tension, of two or more secondary batteries arranged in series in such main circuit and shunts around such secondary batteries containing translating devices, such as electric lamps or motors, whereby a division of the current in the main circuit is secured, substantially as set forth.

4. The combination, with one or more dynamo or magneto electric machines supplying a current of high tension in a main circuit, of two or more secondary batteries arranged in series in such main circuit, shunt-circuits around such secondary batteries, and translating devices connected in multiple arc in such shunt-circuits, substantially as set forth.

This specification signed and witnessed this 22d day of May, 1882.

THOMAS A. EDISON.

Witnesses:
   EDW. C. ROWLAND,
   C. P. MOTT.